J. F. BOBBITT.
CHILD'S VEHICLE.
APPLICATION FILED MAY 16, 1921.

1,410,547.

Patented Mar. 28, 1922.
2 SHEETS—SHEET 1.

JAMES F. BOBBITT
INVENTOR.

BY
Beall & Fenwick
ATTORNEYS

J. F. BOBBITT.
CHILD'S VEHICLE.
APPLICATION FILED MAY 16, 1921.

1,410,547.

Patented Mar. 28, 1922.
2 SHEETS—SHEET 2.

JAMES F. BOBBITT
INVENTOR.

BY
Beall & Fenwick
ATTORNEY.

UNITED STATES PATENT OFFICE.

JAMES FRANK BOBBITT, OF GREENWOOD, MISSISSIPPI.

CHILD'S VEHICLE.

1,410,547.  Specification of Letters Patent.  Patented Mar. 28, 1922.

Application filed May 16, 1921. Serial No. 469,924.

*To all whom it may concern:*

Be it known that I, JAMES F. BOBBITT, a citizen of the United States, residing at Greenwood, in the county of Leflore and State of Mississippi, have invented certain new and useful Improvements in Children's Vehicles; and I do hereby declare the following to be a full, clear, and exact description of the invention, such as will enable others skilled in the art to which it appertains to make and use the same.

This invention relates to improvements in toy vehicles of the tricycle type and consists mainly in providing a suitably rearwardly extending framework of novel construction for supporting an additional seat and providing a platform upon which the occupant of the additional seat may rest his feet, or where the additional seat is made removable, the platform may serve as a support for the feet of an additional rider standing upright on the same, or also serve as a receptacle for carrying small articles.

Such a vehicle will afford a great deal of pleasure to children and will enable a single child to ride on the same or to take another child on behind. The need of a child's vehicle of this type has been long felt. The simplicity of the construction, which I have devised, enables it to be produced at a reasonable cost.

In the accompanying drawings, Figure 1 is a side elevation of a child's vehicle embodying my invention;

Figure 1:
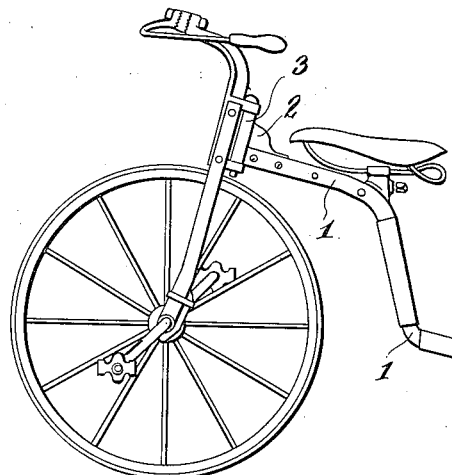
Figure 2:
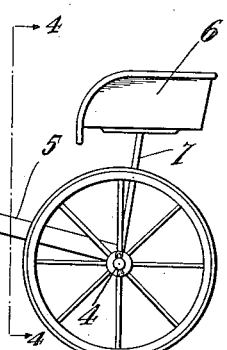
Figure 2 is a rear view of same.
Figure 2:
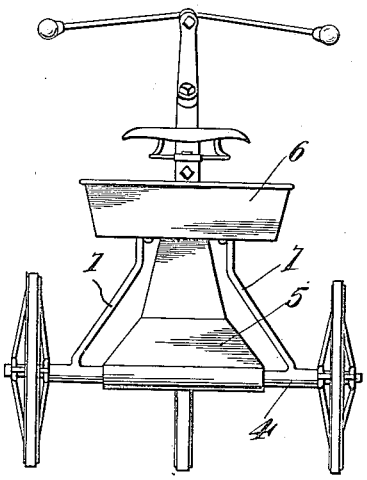
Figure 3:
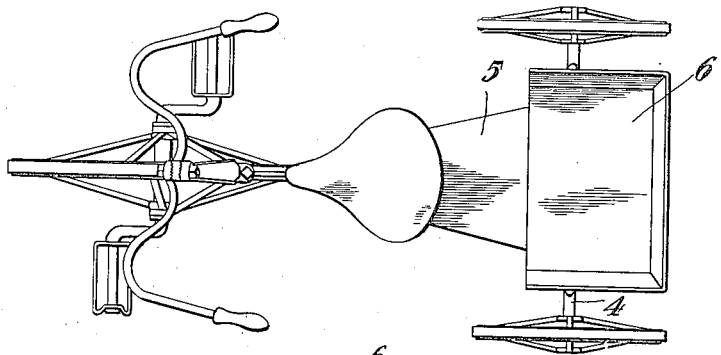
Figure 3 is a top plan view thereof.
Figure 5:
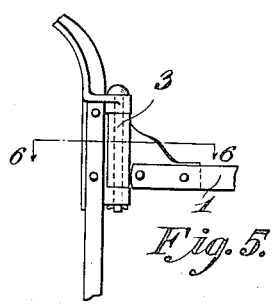
Figure 5 is a detail fragmentary view of the steering head connection.
Figure 6:
Figure 6 is a section on the line 6—6 of Figure 5.
Figure 4:
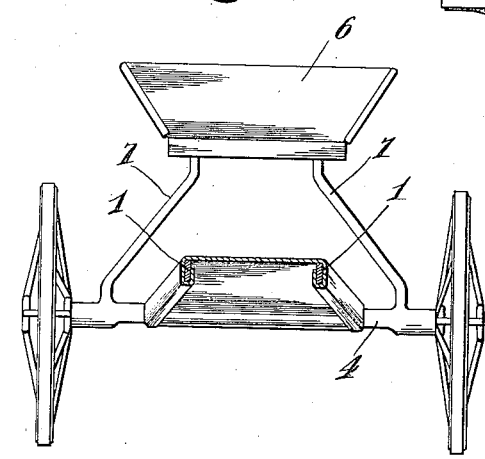
Figure 4 is a sectional view through Figure 1 on the line 4—4.

In the drawings, the rear framework of the vehicle which connects the steering head with the rear axle is substantially V-shaped and consists of two side bars 1 which are extended forwardly and then upwardly and again forwardly and are brought close together in parallelism with a space between them, between which a connecting plate 2, formed with an eye 3, is secured, and through this eye a bolt is passed for pivoting the steering head carrying the front wheel and handle bars to said rear frame. The steering head, front wheel and pedals and the rear axle and wheels are all of well-known construction and need not be described.

The rearwardly extending framework is connected to the rear axle 4 in any suitable manner. This framework carries a platform 5 preferably made of sheet iron which is secured thereto by bending said sheet iron over the edges of said framework and around the rear axle or in any other suitable manner. This sheet iron platform provides a support for the feet of the occupant of the rear seat 6 and also serves as a strengthening means for the rearwardly extending framework and as a support for carrying small articles. The additional seat 6 is supported on the rear axle 4 by means of support 7.

Figure 7:
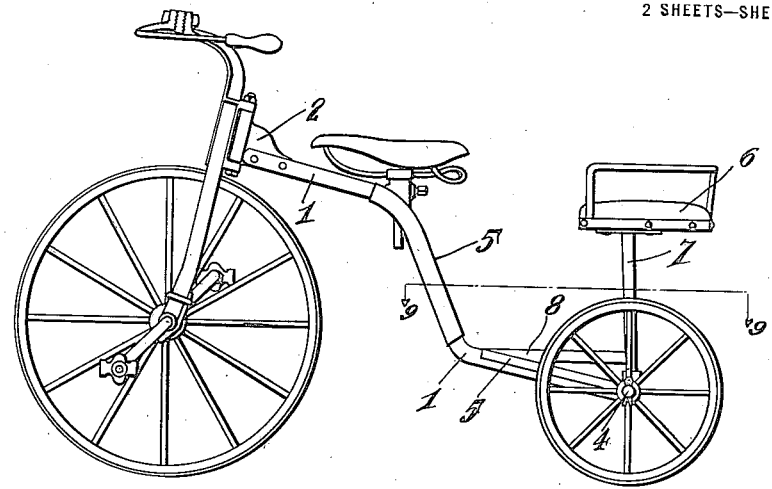
Figure 7 is a side elevation of a modified form of the vehicle, showing the additional seat detachable.
Figure 8:
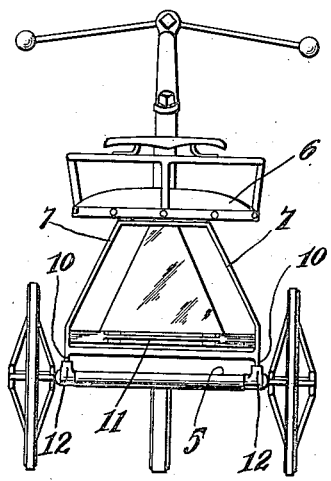
Figure 8 is a rear view of the same.
Figure 9:
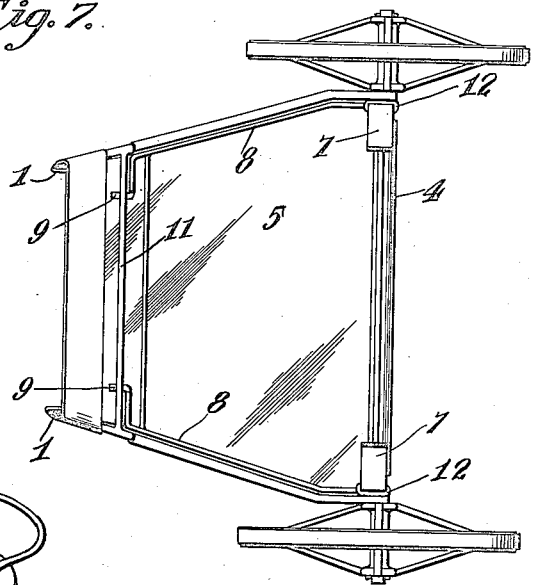
Figure 9 is a sectional view taken on the line 9—9 of Figure 7.
Figure 10:
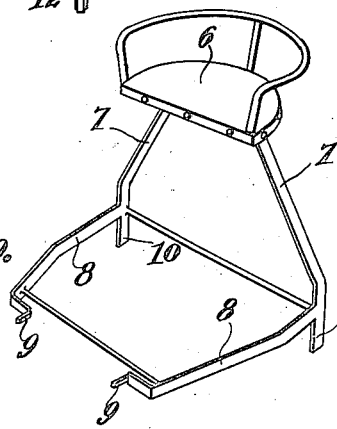
Figure 10 is a perspective view of the detachable seat and supporting framework.

In Figure 7 I have shown a modified form of my invention in which the rear additional seat is shown removable. In many instances a child may not desire to carry another passenger on his vehicle, or he may desire to remove the additional seat and permit another child to stand on the rear platform 5 in an erect position permitting his hands to rest on the shoulders of the occupant of the front seat or saddle. The fact that the rear seat is removable will constitute a very attractive feature of the vehicle for children and facilitate its ready sale, as parents of children and children themselves will be attracted by the fact that the vehicle may be used by two persons, or may be readily converted into a machine capable of carrying a single passenger, thus adding greatly to the enjoyment of children.

In order that the rear seat may be perfectly secured without liability of the child, occupying the same, being tilted backward and injured, and at the same time provide for the ready attachment and detachment of said seat, I provide a suitable framework 8 which is formed with forwardly extending lugs 9 and downwardly extending lugs 10 and also provide a horizontally extending bar 11 across the front end of the horizontal platform 5 in which bar 11 are provided apertures into which the forwardly extending lugs 9 may be entered. To the rear axle 4 are secured vertically apertured sockets 12 into which the downwardly extending lugs 10 may be seated. By this arrangement the forwardly projecting lugs 9 may be readily inserted into the apertures in the bar 11 and the downwardly extending lugs 10 dropped into the vertically arranged apertured sockets 12 on the rear axle 4 which will prevent the rear seat from tilting backwards and also give it a proper vertical support on the axle. When it is desired to remove the seat so that the child on the saddle or front seat can ride alone or so that another child can stand on the rearwardly extending platform 5 with his hands resting on the shoulders of the occupant of the front seat, it is only necessary to lift said rear seat sufficiently to disengage the lugs 10 from the sockets 12 and then pull the seat and its supporting framework rearwardly so as to disengage the lugs 9 from the apertured bar 11. The provision of the supporting platform 5 extending, as it does, entirely across the vehicle from one side of the rearwardly extending framework to the other and securing the same around said framework and around the rear axle not only greatly adds to the strength of the vehicle but in addition forms a support for the feet of the occupant of the rear seat and also provides a platform or support for carrying small packages of any kind without liability of their falling off; or for a child to sit or stand on.

Having now described my invention, what I claim as new and desire to secure by Letters Patent is:

1. In a child's vehicle of the class described, a steering head carrying a front wheel and pedals, a rearwardly extending framework attached to the steering head and to the rear axle, a solid platform extending across the vehicle beneath the additional seat and attached to the side bars of the rearwardly extending framework and to the rear axle, and an additional bar extending across the front end of the supporting platform, apertured lugs carried by the rear axle, a supporting frame for the rear seat provided with forwardly extending lugs for engaging the apertured bar and downwardly extending lugs for engaging the apertured sockets carried by the rear axle and providing for the ready detachment and removal of the rear seat.

2. A child's vehicle including a rearwardly extending framework, a solid platform mounted upon said framework and having its edges extended over and around the side portions of the frame and the rear end of said platform being adapted to embrace the rear axle of the vehicle.

3. A child's vehicle including a rearwardly extending frame, a platform mounted upon said frame, an auxiliary seat mounted upon the rear axle of the vehicle and supported above the platform, spaced sockets carried by the rear axle, a supporting frame for the auxiliary seat having lugs for engagement with the rearwardly extending framework and additional lugs for engagement within sockets on the rear axle to detachably mount the auxiliary seat upon the vehicle.

4. In a child's vehicle of the class described, a steering head carrying a front wheel and pedals, a rearwardly extending framework attached to the steering head and to the rear axle, an auxiliary seat supported above the rear axle, a platform extending across the vehicle beneath the auxiliary seat and attached to the side bars of the rearwardly extending framework and to the rear axle, an additional bar extending across the front end of the supporting platform, sockets carried by the rear axle, a supporting frame for the rear seat provided with forwardly extending lugs for engaging the additional bar and downwardly extending lugs for engaging the sockets carried by the rear axle whereby to removably mount said auxiliary seat.

In testimony whereof I affix my signature in presence of two witnesses.

JAMES FRANK BOBBITT.

Witnesses:
JOE WHEELER WILLIAMS,
CHAS. A. CARROLL.